March 31, 1942.      H. F. TÖNNIES      2,278,338
PHOTOELECTRIC APPARATUS FOR CAMERAS
Filed Dec. 9, 1938      3 Sheets-Sheet 1
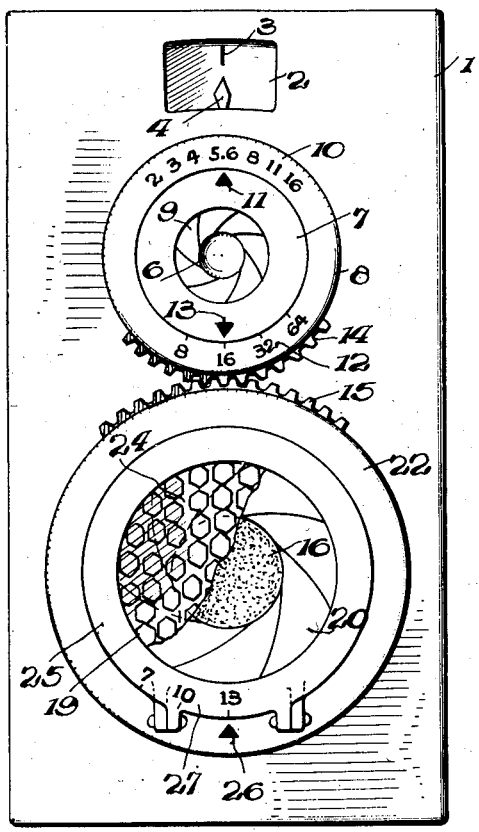
Fig. 1.
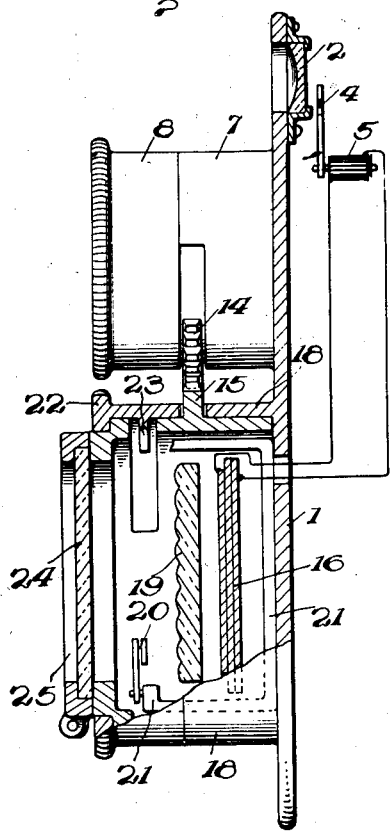
Fig. 2.
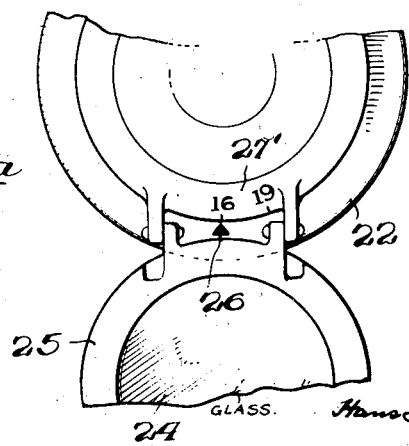
Fig. 1ª.
Inventor:
Hans Ferdinand Tönnies
By Potter, Pierce & Scheffler,
Attorneys.

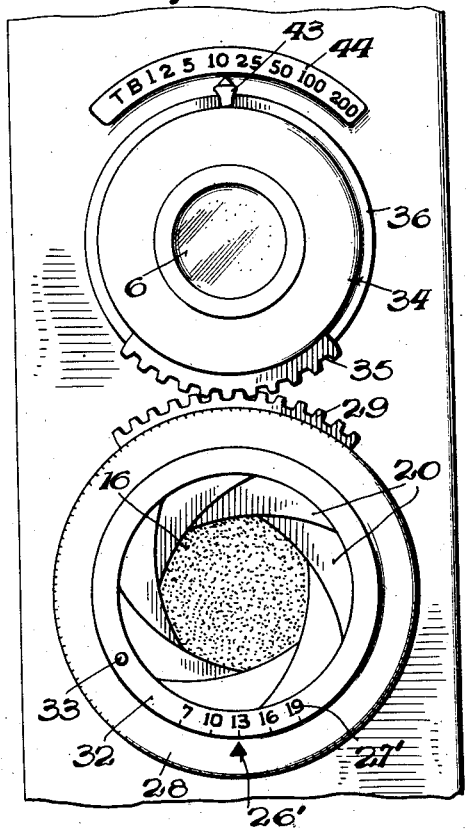
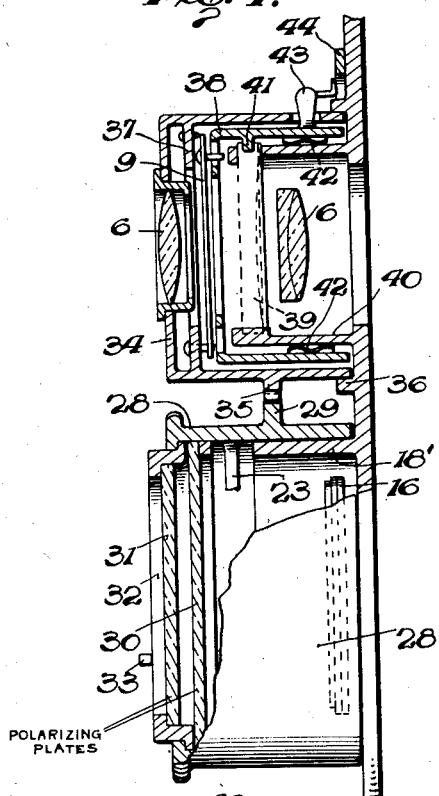
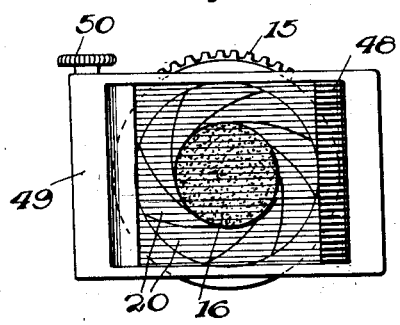
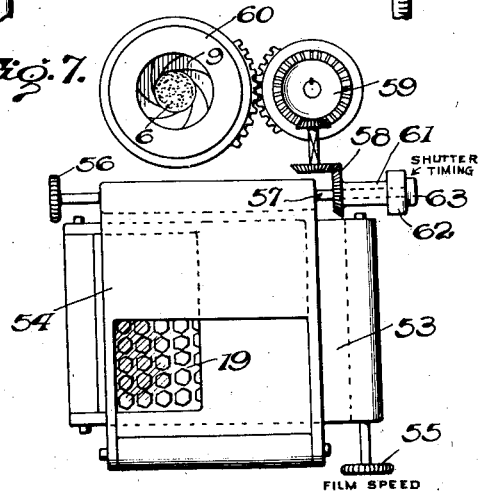
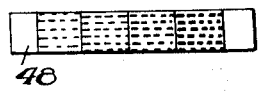

March 31, 1942.   H. F. TÖNNIES   2,278,338
PHOTOELECTRIC APPARATUS FOR CAMERAS
Filed Dec. 9, 1938   3 Sheets-Sheet 3
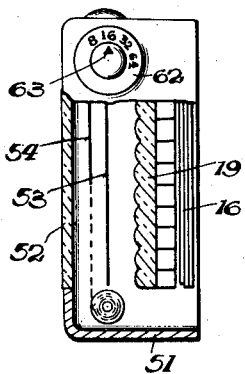
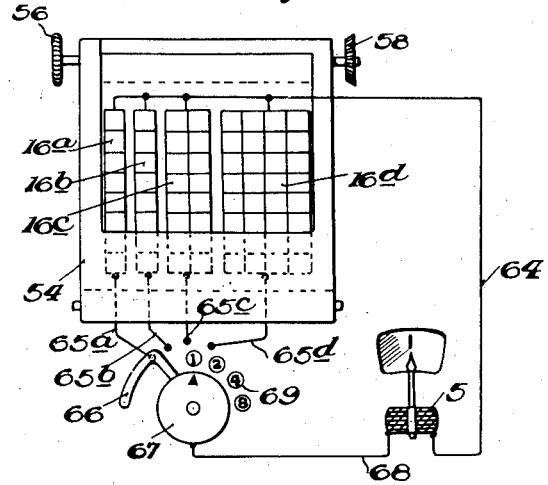
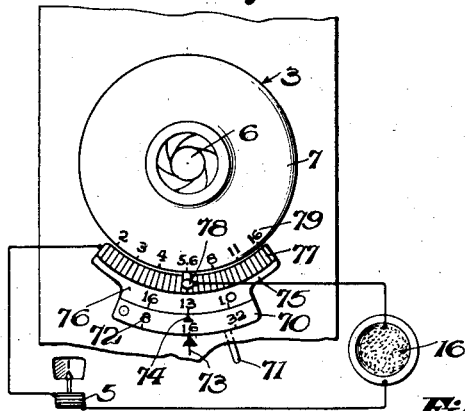

Patented Mar. 31, 1942

2,278,338

UNITED STATES PATENT OFFICE 2,278,338

PHOTOELECTRIC APPARATUS FOR CAMERAS

Hans Ferdinand Tönnies, Hamburg-Grossflottbek, Germany

Application December 9, 1938, Serial No. 244,858
In Germany June 4, 1938

5 Claims. (Cl. 95—10)

This invention relates to photoelectric apparatus for cameras and particularly to photoelectric apparatus for the semi-automatic or automatic regulation of the shutter or diaphragm elements of a camera.

Semi-automatic cameras have been proposed in which the photoelectric system included a plurality of electrical or optical devices for throttling the current output of a photoelectric cell, one device being coupled to and adjusted by the camera shutter or diaphragm and the other device or devices being graduated for adjustment in accordance with preselected values of film speed, diaphragm opening or shutter timing respectively, filter factor, etc. Such systems were operated by first setting those devices which control current flow in accordance with preselected exposure factors, directing the camera towards the scene, and adjusting the camera-coupled device to set an instrument pointer in line with an index mark.

Objects of the present invention are to provide photoelectric apparatus for regulating the exposure apparatus of a camera, the apparatus including a photocell, a current choke device coupled to the exposure apparatus for adjustment thereby, and other devices adjustable to alter the physical and/or electrical relationship of the current choke device to the exposure apparatus or the photocell. An object is to provide photoelectric apparatus of the type stated including a current choke device coupled to the adjustable element of a camera shutter or diaphragm, the coupling being adjustable to alter the control exerted by the camera element upon the current choke in accordance with preselected values of one or more exposure factors. An object is to provide photoelectric apparatus of the type stated which includes a photoelectric cell, a current choke in the form of an iris diaphragm in front of the cell, and an additional diaphragm in front of the cell and adjustable in accordance with a preselected value of an exposure factor. A further object is to provide photoelectric apparatus including a photocell and relatively adjustable polarizing plates for limiting the transmission of light to the photocell. Further objects are to provide a semi-automatic motion picture camera including a member adjustable to control the picture frame speed and carrying graduations of film speed, a lens housing including an adjustable diaphragm, and a resistance choke controlled by the adjustment of the lens diaphragm; the resistance choke or the lens housing being adjustable with respect to the frame control member in accordance with the selection of the film speed. Another object is to provide photoelectric apparatus including a multiple element photocell system, a diaphragm adjustable to control the fraction of each cell element that is exposed to light reflected from the scene, and a switch adjustable to determine the active cell elements in accordance with a preselected value of an exposure factor.

These and other objects and advantages of the invention will be apparent from the following specification when taken with the accompanying drawings in which:

Fig. 1 is a front elevation, with parts broken away, of an embodiment of the invention;

Fig. 1a is a fragmentary front elevation of the cell housing, with the filter plate turned into inoperative position;

Fig. 2 is a fragmentary side elevation, with parts in section;

Figs. 3 and 4 are a front elevation and a fragmentary side elevation of another embodiment;

Fig. 5 is a front elevation of a photocell and associated current chokes;

Fig. 6 is an elevation, on a smaller scale, of the translucent roll diaphragm of the Fig. 5 construction;

Figs. 7 and 8 are a front elevation and a transverse section, respectively, of another photocell and current choke;

Fig. 9 is a front elevation of a multiple element photocell system, the circuit connections to the elements being shown diagrammatically;

Fig. 10 is a tabulation of photographic values for use with the Fig. 9 apparatus;

Fig. 11 is a fragmentary front elevation of a motion picture camera having two adjustable current choke devices associated with the camera diaphragm;

Fig. 12 is a diagrammatic view illustrating another adjustment of the Fig. 11 apparatus; and Figs. 13 and 14 are fragmentary front elevations, in different positions of adjustment, of another motion picture camera embodying the invention.

In Figs. 1 and 2 which illustrate the invention embodied in a semi-automatic motion picture camera, the reference numeral 1 identifies the front plate upon which the camera lens and photoelectric system are preferably mounted for assembly, as a unit, on the camera case. The plate 1 has an opening at which the front lens 2 of the view finder is located, and an index mark 3 on the lens 2 indicates the position to which the pointer 4 of the instrument coil 5 must move to obtain an appropriate adjustment of the lens diaphragm for the selected film and frame speed at the existing scene brightness.

The camera lens 6 is mounted in a housing 7 on which an outer sleeve 8 may be adjusted to control the diaphragm 9. A scale 10 of stop values is carried by the sleeve 8 and moves past an index mark 11 on the housing 7 to indicate the size of the diaphragm opening. The sleeve and housing also carry a scale 12 of frames per second and an index mark 13, and the sleeve has a crown gear 14 which meshes with a crown gear 15 of the mechanism for throttling current flow in the photoelectric system.

The photocell 16 is within a cylindrical casing 17 that carries the crown gear 15 and is rotatable within a sleeve 18 that projects from the front plate 1. A multiple lens plate 19 may be arranged in front of the cell 16 to limit the acceptance angle of the cell to the image angle of the camera lens 6 when the casing is not of sufficient depth to serve as a mechanical angle-restricting baffle, and an iris diaphragm 20 is also located in front of the cell and supported from a base 21 that is fixed to the plate 1. The iris diaphragm is not adjusted directly by the casing 17 but by an outer sleeve 22 that is frictionally held to the casing 17 and has an arm 23 which extends through a slot in the casing to engage the actuating ring of the diaphragm 20. A transparent plate 24 of definite light absorbing value is mounted in a ring 25 that is hinged on the outer end of the casing 17.

An index mark 26 on the iris-adjusting sleeve 22 cooperates with scales 27, 27' of film speed, for example degrees DIN, marked on the outer faces of the ring 25 and the casing 17. When the plate 24 absorbs one-half the light and successive film speed graduations correspond to a doubling of the film speed, the graduations of scales 27, 27' are displaced by one value. The purpose of the light-obstructing plate is to permit use of simpler iris diaphragm constructions as current throttling action corresponding to a very small diaphragm opening can be obtained with larger openings when the plate 24 is turned up into operative position as shown in Figs. 1 and 2.

The apparatus is employed in the following manner. The diaphragm systems of the cell and camera lens are adjusted with respect to each other in accordance with the selected values of emulsion speed and frame speed by grasping the milled rims of the sleeves 8 and 22 and turning the sleeves to bring the frame speed value of scale 12 in line with the mark 13, and the mark 26 of sleeve 22 in line with the emulsion speed value on scale 27 or 27'. The frictional engagement of sleeve 22 with the photocell casing 17 must be overcome in making this adjustment, but the sleeve 22 and casing 17 then move as a unit in the subsequent operations. The camera is directed at the scene to be photographed and the sleeve 22 is then turned to adjust the effective area of the photocell 16 to that value which, for the existing average scene brightness, brings the instrument pointer 4 in line with the index mark 3. This adjustment of the cell diaphragm produces a corresponding adjustment of the lens diaphragm through the gears 14, 15. As shown in Figs. 1 and 2, the preliminary adjustment was for a film speed of 13° DIN and the standard frame speed of 16 per second, and the scene brightness was such that the pointer 4 alined with mark 3 at a lens diaphragm setting of f 5.6.

The preliminary adjustment for film speed may be effected by an angular adjustment of two polarizing plates in front of the photocell. As shown in Figs. 3 and 4, a single sleeve 28 is rotatable upon the short casing 18' within which the cell 16 is located, the gear segment 29 and the pin 23 for adjusting the iris diaphragm 20 being carried by the sleeve 28. A polarizing plate 30 is secured to the sleeve 28 and a second polarizing plate 31 is mounted in a ring 32 that is rotatable on the sleeve. A mark 26' and a scale 27' are provided on sleeve 28 and ring 32, and a pin 33 projects from the ring 32 to facilitate its angular adjustment. The plates 30, 31 may be of known type having crystals of iodine-quinine-sulphate in parallel arrangement. The maximum light is transmitted when the polarizing planes of the plates are parallel, and the transmission is reduced to a minimum when ring 32 is turned to set the polarizing planes at 90°.

The outer sleeve 34 of the lens housing has a gear segment 35 meshing with the gear 29 of the photocell system, the sleeve 34 being rotatable in a flange 36 on the supporting plate 1 and having an interior flange 37 to which one end of each blade of the diaphragm 9 is pivoted. The other end of each blade is loosely pivoted to a flange on the sleeve 38 that constitutes the manually adjustable shutter mechanism (indicated by the dotted line rectangle 39). The shutter is mounted on the fixed tubular element 40 and sleeve 38 has a pin 41 for setting the shutter, the sleeve 38 being yieldingly retained in adjusted position on element 40 by friction-producing springs 42. A handle extends from sleeve 38 through a slot in the outer sleeve 34 and carries a pointer which moves along the scale 44 of shutter speeds.

The apparatus is operated in the following manner to determine the diaphragm opening that is appropriate for a selected film speed and shutter speed. The film speed setting is made by adjusting the ring 32 to set the selected film speed value of scale 27' in line with the mark 26' on the sleeve 28. The camera shutter is then adjusted to the desired value by turning the handle 43 to aline the pointer with the selected shutter speed value on scale 44. This shutter speed adjustment locates the relatively stationary ends of the diaphragm blades in a definite position that is dependent upon the shutter timing. The camera is provided, as in the embodiment shown in Figs. 1 and 2, with a measuring instrument having a pointer that is to be alined with an index mark. The camera is directed at the scene after the described settings are made, and the sleeve 28 of the photoelectric system is turned to modulate the light reaching the cell 16 to that value for which the instrument pointer stands in alinement with the index mark. The camera diaphragm is adjusted by this turning of the sleeve 28, due to the gear segments 29, 35, but the shutter speed adjustment is not affected as the springs 42 retain the sleeve 38 in the position to which it was adjusted by the handle 43.

A modified form of current throttle for use with a photocell 16 and iris diaphragm 20 such as shown in Figs. 1 and 2 is illustrated in Figs. 5 and 6. A transparent strip 48 having sections of different light absorbing value, varying in the ratio of 1:2:4:8 etc. when the emulsion speed graduations correspond to that geometric series, is mounted on rollers in a housing 49 in front of the photocell and is adjusted manually by a knob

50 that has a mark movable along an emulsion speed scale, not shown, on the housing 49.

As shown in Figs. 7 and 8, the effective area of the photocell 16 is varied by two screens, one being adjustable as a function of film speed and the other being adjustable to determine the setting of the camera mechanism in accordance with shutter speed or diaphragm opening and the existing light. The cell and baffle are mounted in a housing 51 which has a transparent cover plate 52 for admitting light. Bands 53, 54 having transparent and opaque sections are mounted on rollers at right angles to each other and adjustable by knobs 55, 56, respectively, to exert independent controls over the effective area of the cell. The knob 55 is movable adjacent emulsion speed graduations and thereby affects the cell area in accordance with the selected film speed. The shaft 57 controlled by the knob 56 carries a bevel gear 58 that is coupled through gearing 59 to the adjusting ring 60 of the camera diaphragm. A friction coupling is included in this transmission to provide a control based on the shutter timing. As shown, the gear 58 is mounted on a sleeve 61 that frictionally engages the shaft 57 and has an enlarged head 62 carrying a scale of frames per second adjacent a fixed mark on the enlarged end 63 of the shaft 57. The adjustments for film speed and shutter timing may of course be interchanged.

According to the embodiment shown in Fig. 9, one control over the effective cell area is provided by subdividing the cell into sections 16a, 16b, 16c and 16d and employing a switch to connect one or more of the cell sections in circuit in accordance with the selection of a value for one exposure factor or, by use of a tabulation such as that of Fig. 10, the selection of the values for two exposure factors. The exposed areas of the cell sections are controlled by a screen 54 and knob 56 that may be substantially as described with reference to Figs. 7 and 8, and the shaft carrying a gear 58 that is coupled to the diaphragm setting mechanism of the camera. One terminal of each cell section is connected by lead 64 to the instrument coil 5 and leads 65a—65d extend from the opposite terminals of the cell sections to contact points of a switch having an arcuate contact arm 66 that is adjustable by knob 67 to connect one or more of the cell sections to the coil 5 through the lead 68. Knob 67 of the switch has a mark for setting to the appropriate graduation or symbol of scale 69. The illustrated series of symbols ① to ⑧ of scale 69 correspond to the photographic values in that geometric series that may be obtained from a tabulation or chart, as in Fig. 10, of frame speed and emulsion speed. Other factors such as camera image angle and filter factor may be combined in preparing the tabulation.

The arrangements illustrated in Figs. 11 to 14 provide compact controls for the photoelectric system of motion picture cameras, one adjustable element also serving to set the frame speed of the camera. In Figs. 11 and 12, the plate or slide 70 is mounted on the camera case for adjustment about the axis of the camera lens 6 to control the frame speed through the lug 71 which extends into the camera casing to engage the shutter mechanism, not shown. The slide 70 has a scale 72 of frame speed cooperating with a mark 73 on the camera case, and a mark 74 adjacent the edge of the angularly adjustable plate 75. The plate 75 has a scale 76 of emulsion speeds at its edge adjacent the mark 74 and a resistor 77 at its inner edge, the resistance being engaged by a contact on the lever 78 which adjusts the diaphragm 9 in accordance with the lever position along the diaphragm scale 79 on the lens housing 7. The contact and resistor are connected between the photocell and instrument in known manner to throttle current flow as a function of the diaphragm opening. The apparatus is adjusted by setting the slide 70 for the desired number of frames per second, and then setting the plate 75 to aline the selected film speed value of scale 76 with the mark 74. The camera is directed towards the scene and the diaphragm lever 78 is adjusted to bring the instrument pointer 4 into line with the index mark 3, as in the camera of Figs. 1 and 2. The parts as shown in Fig. 11 are set for 16 frames per second and a film speed of 13° DIN, and the scene brightness was such that the camera lens was set at f 5.6. The same frame speed setting is shown in Fig. 12 but the lower film speed of 10° DIN is indicated. For the same scene brightness as in Fig. 11, the lens diaphragm must be opened to f 4.

In the embodiment shown in Figs. 13 and 14, the lens housing 7' is adjustable to vary the relative position of the diaphragm lever 78 with reference to a resistor 77' that is fixed to the camera casing. The slide 70' for adjusting frame speed has a scale 72 of frame speeds cooperating with a fixed mark 73, and a scale 76 of emulsion speeds at its inner edge. The lens housing 7' has a mark 74' which is to be set at the appropriate film speed value of scale 76 after the slide 70' is adjusted to set the frame speed. The adjustments shown in Fig. 13 correspond to 16 frames per second, a film speed of 13° DIN, and a diaphragm opening of f 5.6. The parts are shown in Fig. 14 as adjusted for 32 frames per second and the same film speed, thus indicating a stop of f 4 for the same scene brightness.

The described embodiments of the invention indicate that there is considerable latitude in the design and construction of the current throttling elements that are correlated to provide compact and readily adjustable devices for varying the relationship of scene brightness to pointer deflection in accordance with the preselected values of certain exposure factors.

I claim:

1. In photoelectric apparatus for correlating selected exposure factor values and the scene brightness to indicate the settings for the members controlling the shutter and diaphragm of a camera, an instrument having a pointer movable with respect to an index mark, a photoelectric cell connected to said instrument, an iris diaphragm in front of said cell, a member movable to adjust said iris diaphragm, means coupling said movable member to both of the controlling members for actuation in accordance with adjustments of the camera shutter and diaphragm, a pair of angularly adjustable polarizing plates in front of said photoelectric cell, and scale means for setting said polarizing plates in different angular adjustments in accordance with selected values of emulsion speed.

2. In a camera, a lens housing having an adjustable shutter and an iris diaphragm, a photoelectric system including a photocell connected to an instrument and a current choke for varying current flow to said instrument for a given light intensity, a pair of members each movable to adjust said iris diaphragm, means coupling one of said members to the current choke, and means actuated by a manual adjustment of the other member for setting said shutter.

3. In a camera, a lens housing, iris diaphragm blades within said housing, a pair of movable ring members to which the ends of said blades are connected, a shutter mechanism connected to one of said ring members and controlled by the manual adjustment of that ring member, friction means yieldingly retaining the shutter-adjusting ring member in its position of manual adjustment, a photoelectric system including an adjustable current modulating element, and means mechanically connecting the second ring member to the current modulating element.

4. In photoelectric apparatus for correlating selected exposure factor values and the scene brightness to indicate the setting for the exposure controlling mechanism of a camera, an instrument having a pointer movable with respect to an index mark, photosensitive current generating means connected to said instrument, two independently adjustable means for modulating the current output of said current generating means, one of said adjustable means including two relatively movable members carrying cooperating indicia for setting the same in accordance with the selected value of one exposure factor, the other adjustable means including an operating member movable with respect to a fixed member, and means for setting said other adjustable means in accordance with values of a second and a third exposure factor; said last means comprising a movable element coupled to said operating member to adjust the same, a second element movable with respect to said first movable element and to a fixed element, cooperating indicia carried by said movable elements and graduated in values of the second exposure factor, and cooperating indicia carried by said second movable element and said fixed element for setting said second movable element in accordance with values of the third exposure factor.

5. In photoelectric apparatus for correlating selected exposure factor values and the scene brightness to indicate the setting for the exposure controlling mechanism of a camera, an instrument having a pointer movable with respect to an index mark, photosensitive current generating means connected to said instrument, two independently adjustable means of different types for modulating the current output of said current generating means, one of said adjustable means including two relatively movable members carrying cooperating indicia for setting the same in accordance with the selected value of one exposure factor, the other adjustable means comprising an iris diaphragm having a movable operating member, and means for setting said operating member in accordance with values of two other exposure factors; said last means comprising a movable element coupled to said operating member to adjust the same, a second element movable with respect to said first element and a fixed element, cooperating indicia on said movable elements for setting the same in accordance with one exposure factor, and cooperating indicia on said second element and fixed element for setting said second element in accordance with another exposure factor.

HANS FERDINAND TÖNNIES.